(12) United States Patent
Benabdelaziz et al.

(10) Patent No.: US 7,483,280 B2
(45) Date of Patent: Jan. 27, 2009

(54) CAPACITIVE POWER SUPPLY CIRCUIT AND METHOD

(75) Inventors: Ghafour Benabdelaziz, Saint Pierre des Corps (FR); Laurent Gonthier, Tours (FR)

(73) Assignee: STMicroelectronics SA, Montrouge (FR)

( * ) Notice: Subject to any disclaimer, the term of this patent is extended or adjusted under 35 U.S.C. 154(b) by 127 days.

(21) Appl. No.: 11/202,642

(22) Filed: Aug. 11, 2005

(65) Prior Publication Data
US 2006/0034109 A1 Feb. 16, 2006

(30) Foreign Application Priority Data
Aug. 11, 2004 (FR) .................................. 04 51836

(51) Int. Cl.
*H02M 1/12* (2006.01)
*H02M 1/14* (2006.01)
(52) U.S. Cl. ............................... 363/44; 363/45; 363/46
(58) Field of Classification Search ................... 363/44, 363/45, 46
See application file for complete search history.

(56) References Cited

U.S. PATENT DOCUMENTS

| | | | | |
|---|---|---|---|---|
| 3,978,388 A | | 8/1976 | De Vries | |
| 4,353,025 A | * | 10/1982 | Dobkin | 323/300 |
| 4,408,607 A | | 10/1983 | Maurer | |
| 4,673,831 A | * | 6/1987 | Reppen | 327/374 |
| 5,430,637 A | * | 7/1995 | Buck | 363/89 |
| 5,796,599 A | | 8/1998 | Raonic et al. | |
| 6,137,275 A | * | 10/2000 | Ravon | 323/274 |
| 6,373,319 B1 | * | 4/2002 | Rault | 327/452 |
| 6,590,349 B2 | * | 7/2003 | Moindron | 315/240 |
| 7,151,402 B2 | * | 12/2006 | Peron et al. | 327/476 |

FOREIGN PATENT DOCUMENTS

| | | |
|---|---|---|
| EP | 0891039 | 1/1999 |
| GB | 1532677 | 11/1978 |
| GB | 2175463 A | 11/1986 |
| WO | WO03/038984 | 5/2003 |
| WO | WO03/096510 | 11/2003 |

OTHER PUBLICATIONS

French Search Report, FR0451836, Dec. 2, 2004.

* cited by examiner

*Primary Examiner*—Bao Q Vu
(74) *Attorney, Agent, or Firm*—Lisa K. Jorgenson; Paul F. Rusyn; Graybeal Jackson LLP

(57) ABSTRACT

A capacitive power supply circuit, comprising a power storage element between two output terminals for providing a rectified output voltage; in series between a first input terminal for applying an A.C. voltage and a first of the output terminals, at least one capacitor and a first diode; a switch controllable by application of a signal on a triggering terminal; and means for controlling said switch to the on state when the output voltage is in a predetermined range of values.

20 Claims, 3 Drawing Sheets

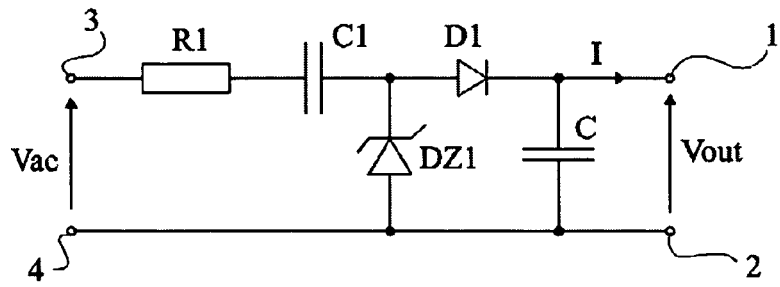
Fig 1
(prior art)
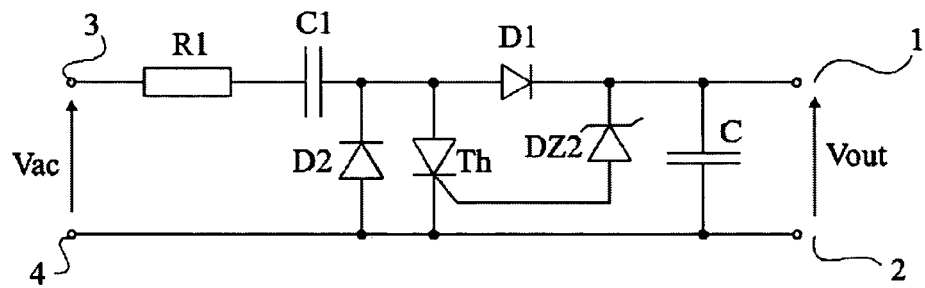
Fig 2
(prior art)
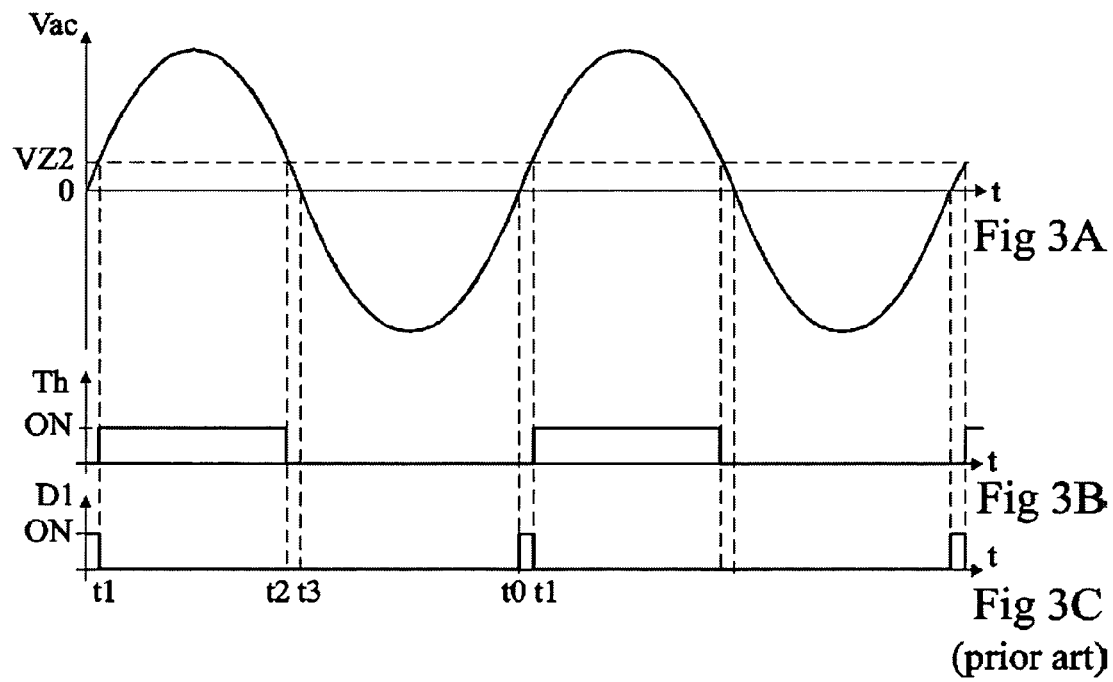
Fig 3A
Fig 3B
Fig 3C
(prior art)

CAPACITIVE POWER SUPPLY CIRCUIT AND METHOD

PRIORITY CLAIM

This application claims priority from French patent application No. 04/51836, filed Aug. 11, 2004, which is incorporated herein by reference.

BACKGROUND OF THE INVENTION

1. Field of the Invention

Embodiments of the present invention relate to the field of capacitive power supply circuits which are intended to provide a rectified smoothed output voltage across a power storage element (capacitor) from an alternating current (A.C.) supply voltage.

2. Discussion of the Related Art

Capacitive power supply circuits belong to the different solutions for supplying power to a load from an A.C. supply voltage originating, for example, from the electric supply mains (220 volts or 110 volts).

Capacitive power supplies are especially preferred to magnetic transformer or high frequency power supplies (switched-mode power supplies) for small powers (output currents of approximately some ten milliamperes) for reasons of cost or when the stand-by consumption is desired to be minimized.

FIG. 1 shows a conventional example of a capacitive power supply circuit This circuit essentially comprises a first capacitor C having a D.C. output voltage Vout provided between its terminals 1 and 2. This voltage is obtained from an A.C. supply voltage Vac (for example, the electric distribution mains voltage) applied between two input terminals 3 and 4 of the capacitive power supply circuit terminals 2 and 4 being connected. Between terminals 3 and 1 are connected, in series, a resistor R1, a capacitor C1, and a diode D1 having its cathode directly connected to terminal 1 (positive electrode of output capacitor C). Diode D1 forms a halfwave element for rectifying voltage Vac to charge capacitor C. The value of output voltage Vout is set by a zener diode DZ1 connecting the anode of diode D1 to ground 2 (the cathode of diode DZ1 being directly connected to the anode of diode D1). The function of resistor R1 is to limit the current surge on circuit power-on. This resistor is sometimes omitted. The function of capacitor C1, which is a high-voltage A.C. transistor (several hundreds of volts), is to limit the current provided to the load. Diode DZ1 is used for the regulation while capacitor C, which is a low-voltage capacitor (a few tens of volts at most), is used as a power sink. Diode D1 is used to prevent the discharge of capacitor C into the A.C. power supply. Generally, resistor R1 is a normalized resistor and the most currently used output voltage is an output voltage of from a few volts to a few tens of volts.

The output current of the power supply circuit essentially is a function of the value of capacitor C1 (and of voltage Vac, frequency and amplitude). Accordingly, capacitor C1 is selected according to the load to be supplied.

As long as voltage Vout has not reached the threshold voltage of diode DZ1 (neglecting the voltage drop in diode D1), diode DZ1 is blocked, enabling charge of the capacitor in positive halfwaves of voltage Vac. As soon as voltage Vout reaches value DZ1, the zener diode starts to avalanche, interrupting the charge of capacitor C.

Such a capacitive power supply has the advantage of an easy implementation as compared to other magnetic transformer or high-frequency solutions.

However, for output currents greater than some ten milliamperes, it generates significant losses when the system is at stand-by, that is, when no power is sampled by the load connected to terminals 1 and 2.

The significant losses during system stand-by result in that, in practice, the capacitive power supply circuits are limited to applications of supply of a current on the order of some ten milliamperes.

To solve this problem, an A.C. power supply circuit using a controllable switching element has already been provided.

FIG. 2 shows an example of such a circuit.

As compared to the assembly of FIG. 1, zener diode DZ1 is replaced with a cathode-gate thyristor Th forming a controllable switch. Thyristor Th connects the anode of diode D1 to ground (common terminals 2 and 4), the cathode of thyristor Th being grounded. The gate of thyristor Th is connected by a zener diode DZ2 to output terminal 1, the anode of diode DZ2 being connected to the gate of thyristor Th. Finally, a diode D2 is connected in antiparallel with thyristor Th, its anode being connected to the terminal 4 while its cathode is connected to the anode of diode D1. Functionally, thyristor Th is intended to be on when capacitor C needs not be charged (voltage Vout greater than the threshold voltage of diode DZ2) and to be off when a charge of capacitor C is required.

FIGS. 3A, 3B, and 3C illustrate the operation of the circuit of FIG. 2 and show, respectively, examples of shapes of voltage Vac, on periods (ON) of thyristor Th, and on periods (ON) of diode D1 for the charge of capacitor C. As long as voltage Vac is, in a positive halfwave with the orientations of the drawings, smaller than threshold voltage VZ2 of diode DZ2, thyristor Th is off and diode D1 is on. From the time (time t1) when voltage VZ2 is reached by voltage Vac, thyristor Th turns on, which forbids continuing the charge of capacitor C. The load connected to terminals 1 and 2 is then supplied by the discharge of capacitor C and diode D1 is off. During positive halfwaves, diode D2 is off.

Towards the end of the positive halfwave (time t2), when voltage Vac falls below threshold VZ2, thyristor Th blocks. However, since voltage Vout is then in principle greater than voltage Vac, diode D1 remains off. Diode D1 is however likely to turn back on by the turning back off of thyristor Th between times t1 and t2 if the load has consumed all the power stored in capacitor C. This hypothetical case is however rather unusual since capacitor C is sized according to the load that it must supply.

From the beginning of the negative halfwave (time t3) and until the next zero crossing (time t0) towards the positive halfwave, diode D2 is forward biased and forbids Conduction of thyristor Th.

The losses in the circuit of FIG. 2 result, in positive halfwaves, from the current in thyristor Th and, in negative halfwaves, from the current in diode D2.

The losses in negative halfwaves in diode D2 approximately correspond to the losses in diode DZ1 (FIG. 1). However, in positive halfwaves, the losses in thyristor Th are much smaller than those in diode DZ1 of FIG. 1. Indeed, the current in stand-by periods, that is, when voltage Vout remains greater than threshold voltage REF since the load does not consume, is a D.C. current in thyristor Th, and thus under a voltage on the order of one volt while, in the case of FIG. 1, it is the avalanche voltage of the zener diode (10 volts, or even more).

For a same admissible system stand-by loss level, the circuit of FIG. 2 enables supplying loads with much greater currents (typically of several tends of milliamperes under a few tens of volts) without for all this increasing the stand-by consumption.

However, a disadvantage of the circuit of FIG. 3 is that it poses problems of electromagnetic compatibility and requires use of a mains filter (not shown) upstream of the system.

A circuit such as described in relation with FIG. 3 is described, for example, in U.S. Pat. No. 5,796,599.

SUMMARY OF THE INVENTION

An aspect of the present invention aims at providing a capacitive power supply circuit which generates no electromagnetic disturbance and avoids use of a mains filter.

Another aspect of the present invention also aims at providing a solution preserving reduced stand-by losses.

A further aspect of the present invention aims at providing a power supply circuit of simple structure as compared to magnetic transformer or high-frequency power supplies.

Another aspect of the present invention aims at providing an entirely-integrable solution.

According to a further aspect of the present invention, a capacitive power supply circuit includes:
- a power storage element between two terminals of provision of a rectified output voltage;
- in series between a first input terminal of application of an A.C. voltage and a first output terminal of provision of said rectified voltage, at least one capacitor and a first diode;
- a switch controllable by application of a signal on a triggering terminal; and
- means for controlling said switch to the on state when the output voltage is in a predetermined range of values.

According to an embodiment of the present invention, said control means are formed of a hysteresis comparator.

According to an embodiment of the present invention, a second diode connects a first electrode of the capacitor, connected to the first diode, directly to a second output terminal.

According to an embodiment of the present invention, said switch is formed of a MOS transistor connecting the first electrode of the capacitor to the second output terminal, said control means being formed of a comparator having an inverting input receiving a voltage proportional to the output voltage and having a non-inverting input connected by a first zener diode to the first output terminal and by a resistor to the second output voltage.

According to an embodiment of the present invention, a second zener diode of value smaller than the first zener diode connects the output of the comparator to its non-inverting input.

According to an embodiment of the present invention, said second diode is formed by the parasitic diode of the MOS transistor.

According to an embodiment of the present invention, a surge current limiting resistor connects the first input terminal to a second electrode of the capacitor.

According to an embodiment of the present invention, said switch is formed of a triac connecting a second input terminal of application of the A.C. voltage to the second output terminal, said control means being formed of a comparator of the output voltage with at least one threshold voltage associated with a circuit for detecting the zero crossing of the A.C. supply voltage to control said triac.

According to an embodiment of the present invention, the storage element is a capacitor.

The foregoing features, and advantages of the present invention will be discussed in detail in the following non-limiting description of specific embodiments in connection with the accompanying drawings.

BRIEF DESCRIPTION OF THE DRAWINGS

FIG. 1, previously described, shows the diagram of a first conventional example of a capacitive power supply circuit;

FIG. 2, previously described, shows a second conventional example of a capacitive power supply circuit;

FIGS. 3A, 3B, and 3C illustrate, in timing diagrams, the operation of the circuit of FIG. 2;

DETAILED DESCRIPTION

Figure 4:
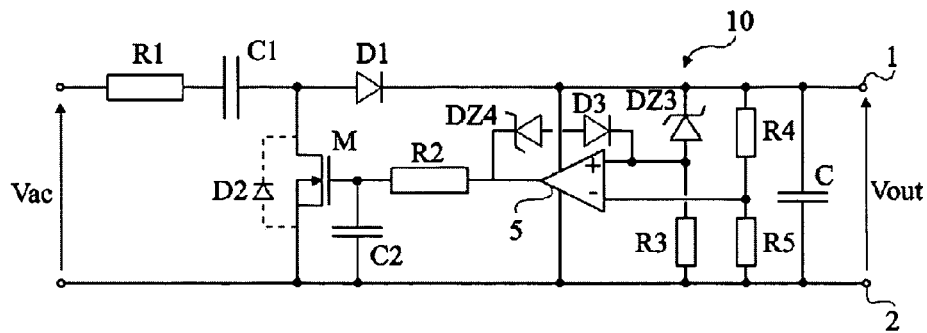
FIG. 4 shows a capacitive power supply circuit according to an embodiment of the present invention.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Same elements have been designated with same reference numerals in the different drawings. For clarity, only those elements which are necessary to the understanding of the present invention have been shown in the drawings and will be described hereafter. In particular, the A.C. power sources usable by a power supply circuit according to the present invention have not been detailed, said sources being compatible with any conventional A.C. power supply. Similarly, the loads likely to be supplied by a capacitive power supply circuit of the present invention have not been detailed, the present invention being compatible with any conventional load, provided for the power supply circuit to be adapted to the current likely to be surged by this load.

FIG. 4 shows a preferred embodiment of a capacitive power supply circuit according to an embodiment of the present invention.

As previously described, such a circuit is intended to receive an A.C. voltage Vac applied between two input terminals 3 and 4 and to provide, across terminals 1 and 2 of a capacitor C forming a power storage element, a D.C. rectified voltage Vout. A resistor R1 (optional), a capacitor C1, and a diode D1 are series-connected between terminals 3 and 1. The sizing of capacitor C1 is performed, as previously described, according to the output current for the load (not shown) supplied by the circuit. The circuit of this embodiment of the present invention uses a controllable switch between the anode of diode D1 and ground. This switch is intended to be on when capacitor C needs not be charged (voltage Vout greater than a reference voltage) and to be off when a charge of capacitor C is required.

The controllable switch is, for example, formed of a MOS transistor M having its drain connected to the anode of diode D1 (and thus a first electrode of capacitor C1) and having its source connected to terminals 2 and 4. The gate of transistor M is connected, by a resistor R2, to the output of a comparator 5 (for example, an operational amplifier) having its respective supply terminals directly connected to output terminals 1 and 2 (that is, downstream of diode D1). Inverting input (−) of comparator 5 receives a voltage representative of voltage Vout by being connected to the midpoint of a resistive dividing bridge formed of two resistors R4 and R5 in series between terminals 1 and 2. The non-inverting input (+) of comparator 5 receives a reference voltage by being connected to the junction point of a zener diode DZ3 with a resistor R3 between terminals 1 and 2. The non-inverting input (+) is further connected to the output of comparator 5 by a diode D3 in anti-series with a zener diode DZ4, the cathode of diode D3 being connected to the non-inverting input of comparator 5 while the cathode of zener diode DZ4 is connected to its output. A capacitor C2 connects the gate of the MOS transistor to ground 2 and forms with resistor R2 an RC cell to stabilize the switchings of the MOS transistor. Capacitor C2 is formed of the stray gate-source capacitance of transistor M or of an additional capacitor. Finally, a diode D2, preferentially formed of the parasitic diode of the MOS transistor, connects the anode of diode D1 to ground 2.

Figure 5A:
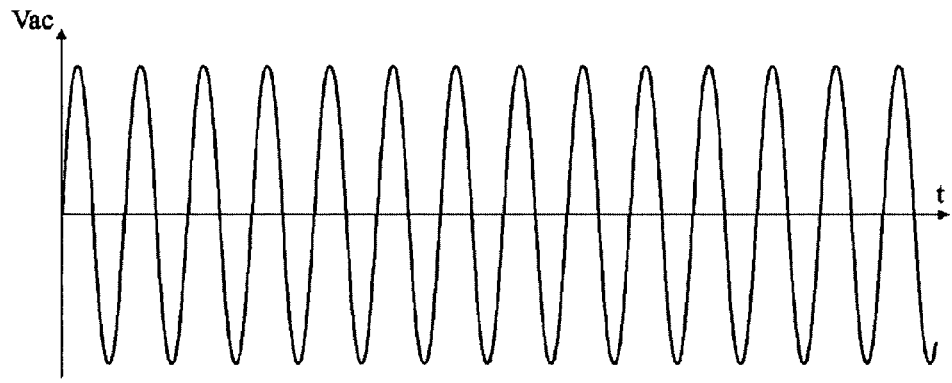
FIGS. 5A, 5B, and 5C illustrate, in timing diagrams, the operation of the circuit of FIG. 5.
Figure 5B:
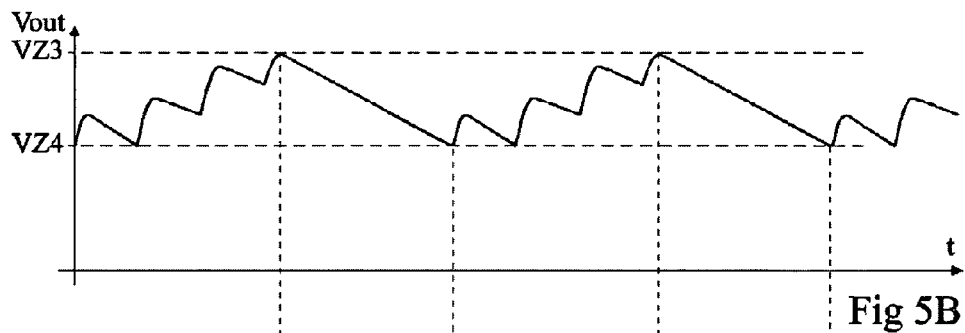
Figure 5C:
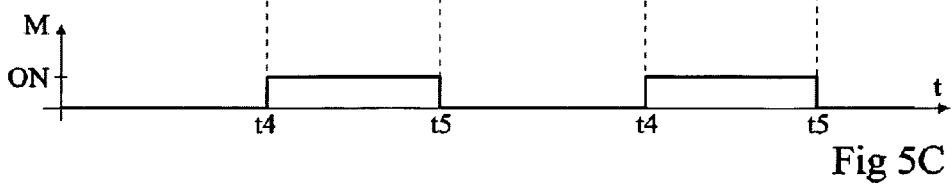

FIGS. 5A, 5B, and 5C illustrate, in timing diagrams respectively showing examples of shapes of voltage Vac, of voltage Vout, and of the on periods (ON) of MOS transistor M, the operation of the circuit of FIG. 4.

During all the negative halfwaves of voltage Vac, diode D2 is forward biased and forbids the conduction of diode D1. Losses are then limited to the current in resistor R1 under the voltage (smaller than 1 volt) of forward-biased diode D2.

During positive halfwaves of voltage Vac, the conduction of transistor M is conditioned by comparator 5, and thus by the amplitude of voltage Vout. As long as voltage Vout is smaller than voltage DZ3, the non-inverting input (+) is grounded by resistor R3 and the output of comparator 5 is also grounded, and transistor M is off. As soon as voltage Vout reaches the threshold of diode DZ3 (typically on the order of 15 volts) corresponding to the desired output voltage, the output of comparator 5 switches and becomes equal to the level of voltage Vout (due to the supply of comparator 5 from this voltage Vout). Zener diode DZ4 is selected to have a value smaller than diode DZ3 to set a hysteresis for the comparator operation. As soon as comparator 5 switches (time t4), diode DZ4 starts an avalanche, which prevents the conduction of diode DZ3. As soon as voltage Vout becomes smaller than voltage VZ4 again, diode DZ4 turns off and, since voltage Vout is smaller than voltage VZ3, comparator 5 switches to turn off transistor M. This operation is illustrated in FIG. 5B by the two respectively high and low thresholds VZ3 and VZ4 between which the charge and discharge periods of capacitor C vary. The possible excursion of output voltage Vout is thus set by the two thresholds VZ3 and VZ4 of diodes DZ3 and DZ4.

The number of halfwaves of voltage Vac for which the capacitor C is considered as being sufficiently charged (between time t4 where threshold VZ3 is reached and a time t5 when voltage Vout becomes smaller than threshold VZ4 again) depends on the load connected downstream of capacitor C. The same occurs for the number of halfwaves between times t5 and t4 for which the charge of capacitor C is performed, on each positive halfwave of voltage Vac.

When the system is at stand-by, that is, no current is sampled by the load connected between terminals 1 and 2 and voltage Vout remains greater than threshold VZ4, the leakage current corresponds to that in MOS transistor M in the on state.

An advantage of this embodiment of the present invention is that, due to the controlled switching of transistor M and to the fact that the noise is averaged by the absence of a switching on each halfwave of voltage Vac, the circuit generates no disturbance on the A.C. power supply. This embodiment of the present invention thus avoids use of an upstream mains filter to comply with electromagnetic compatibility standards.

Another advantage of this embodiment of the present invention is that it enables regulating output voltage Vout, and accordingly, enables optimizing the sizing of capacitor C according to the application and, especially, using in practice capacitors of smaller size.

Figure 6:
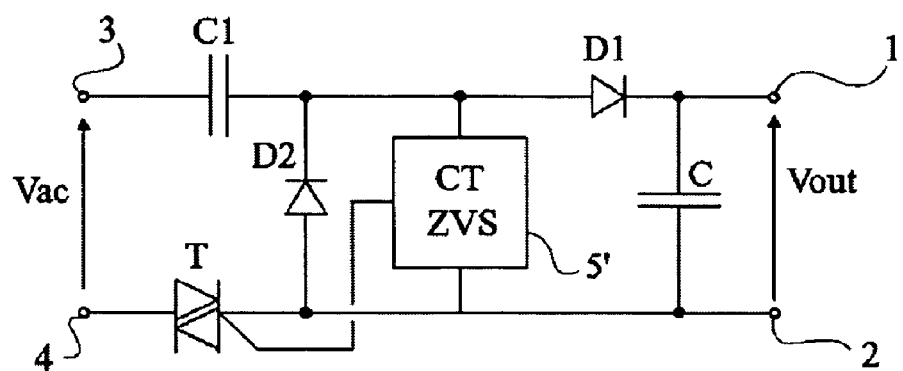
FIG. 6 shows, in the form of blocks, a variation of a capacitive power supply circuit according to another embodiment of the present invention.

FIG. 6 schematically shows in the form of blocks a variation of the capacitive power supply circuit according to an embodiment of the present invention. The switch here is formed of a triac T connecting terminals 4 and 2, and a capacitor C1 in series with a diode D1 connecting terminals 3 and 1. As in the embodiment of FIG. 4, a diode D2 connects the electrode of capacitor C1 which is opposite to terminal 1, directly to terminal 2.

According to this variation, a control circuit 10 of the type described in relation with FIG. 4, that is, comparing output voltage Vout with a predetermined range, to which a conventional function for detecting the zero crossing of the A.C. voltage (ZVS) is added. Circuit 5' controls the turning-on of triac T, which forbids the capacitor charge when it is off. It is thus an inverse control with respect to the controls described in relation with the preceding drawings. The use of a switch (triac T) likely to be turned on in the vicinity of the zero crossings of the A.C. supply voltage avoids use of a resistor R1 to limit current surges on powering-on.

The variation of FIG. 6 is more specifically intended for high powers.

Of course, embodiments of the present invention are likely to have various alterations, improvements, and modifications which will readily occur to those skilled in the art. In particular, the sizing of the different components and especially of the switch triggering threshold voltages of various embodiments of the present invention are within the abilities of those skilled in the art based on the functional indications given hereabove and on the voltage and power of the concerned application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The capacitive power supplies of FIGS. 4 and 6 may be utilized in a variety of different types of electronic devices, particularly those requiring relatively low power outputs and stand-by consumption such as cellular phones, personal digital assistants, and personal music players like MP3 players.

The invention claimed is:

1. A capacitive power supply circuit, comprising:
 a power storage element between two output terminals for providing of a rectified output voltage;
 in series between a first input terminal for applying an A.C. voltage and a first of said output terminals, at least one capacitor and a first diode;
 a switch controllable by application of a signal on a triggering terminal; and
 means for controlling said switch to the on state when the output voltage is substantially equal to a first threshold and to the off state when the output voltage is substantially equal to a second threshold that is lower than said first threshold, said controllable switch connecting a connecting point between said capacitor and said first diode to a second output terminal of said circuit.

2. The circuit of claim 1, wherein said control means are formed of a hysteresis comparator.

3. The circuit of claim 1, wherein a second diode connects a first electrode of the capacitor, connected to the first diode, directly to said second of said output terminals.

4. The circuit of claim 3, wherein said switch is formed of a MOS transistor connecting the first electrode of the capacitor to the second output terminal, said control means being formed of a comparator having an inverting input receiving a voltage proportional to the output voltage and having a non-inverting input connected by a first zener diode to the first output terminal and by a resistor to the second output voltage.

5. The circuit of claim 4, wherein a second zener diode of value smaller than the first zener diode connects the output of the comparator to its non-inverting input.

6. The circuit of claim 4, wherein said second diode is formed by the parasitic diode of the MOS transistor.

7. The circuit of claim 3, wherein a surge current limiting resistor connects the first input terminal to a second electrode of the capacitor.

8. The circuit of claim 1, wherein the storage element is a capacitor.

9. A capacitive power supply circuit including first and second output terminals and first and second input terminals, the input terminals being adapted to receive an AC voltage having a frequency, the power supply circuit further including a switching circuit that is operable to turn on and off at a frequency other than the frequency of the AC voltage and the switching circuit turning on responsive to an output voltage across the output terminals being substantially equal to an upper threshold value and turning off responsive to the output voltage across the output terminals being substantially equal to a lower threshold value to maintain the output voltage within an output range defined by the upper and lower threshold values.

10. The capacitive power supply circuit of claim 9 further comprising:
a power storage element and a rectifying element coupled in series between the first input terminal and the first output terminal;
wherein the switching circuit includes a control node and two signal nodes, with the signal nodes being coupled between the second input terminal and a node defined by the interconnection of the power storage element and the rectifying element; and
wherein the switching circuit further includes a control circuit coupled between the first and second output terminals and operable to apply an active signal to the control node of the switching circuit to turn on the circuit responsive to the output voltage being substantially equal to the upper threshold value and operable to apply an inactive signal to the control node of the switching circuit to turn off the circuit responsive to the output voltage being substantially equal to the lower threshold value.

11. The capacitive power supply circuit of claim 10 wherein the control circuit comprises a hysteresis comparator.

12. The capacitive power supply circuit of claim 10 wherein the switching circuit comprises a MOS transistor.

13. The capacitive power supply circuit of claim 10 further comprising:
a power storage element and a rectifying element coupled in series between the first input terminal and the first output terminal;
wherein the switching circuit includes a control node and two signal nodes, with the signal nodes being coupled between the second input terminal and the second output terminal; and
wherein the switching circuit further includes a control circuit coupled between the second output terminal and a node defined by the interconnection of the power storage element and the rectifying element.

14. The capacitive power supply circuit of claim 13 wherein the switching circuit comprises a triac.

15. An electronic device, comprising:
electronic circuitry coupled to a capacitive power supply circuit, the capacitive power supply circuit including first and second output terminals and first and second input terminals, the input terminals being adapted to receive an AC voltage having a frequency, and the power supply circuit further including a switching circuit that is operable to turn on and off at a frequency other than the frequency of the AC voltage, the switching circuit turning on responsive to an output voltage across the output terminals being substantially equal to an upper threshold value and turning off responsive to the output voltage across the output terminals being substantially equal to a lower threshold value to maintain the output voltage within an output range defined by the upper and lower threshold values.

16. The electronic device of claim 15 wherein the electronic circuitry comprises circuitry forming a cellular telephone.

17. A method of controlling an output voltage developed across a power storage element, the output voltage being derived from an applied AC input signal having a frequency and the method comprising:
applying portions of the AC input signal to the power storage element to transfer power to the power storage element and develop the output voltage;
detecting a value of the output voltage;
stopping the transfer of power from the AC input signal to the power storage element responsive to the detected output voltage being substantially equal to an upper threshold value;
starting the transfer of power from the AC input signal to the power storage element responsive to the detected output voltage being substantially equal to a lower threshold value; and
performing one of the operations of stopping and starting at a frequency other than the frequency of the AC input signal.

18. The method of claim 17 wherein stopping the transfer of power comprises shunting power from AC input signal to a common reference node.

19. The method of claim 17 wherein stopping the transfer of power comprises isolating the AC input signal from the power storage element.

20. The method of claim 17 wherein applying portions of the AC input signal comprises applying portions of positive half waves of the AC input signal.

* * * * *